No. 810,602. PATENTED JAN. 23, 1906.
C. BAAR.
BORING TOOL.
APPLICATION FILED FEB. 6, 1905.

Witnesses
Edward R. Moore.
Georgiana Chace

Inventor
Charles Baar
By Luther V. Moulton
Attorney

UNITED STATES PATENT OFFICE.

CHARLES BAAR, OF GRAND RAPIDS, MICHIGAN.

BORING-TOOL.

No. 810,602. Specification of Letters Patent. Patented Jan. 23, 1906.

Application filed February 6, 1905. Serial No. 244,465.

*To all whom it may concern:*

Be it known that I, CHARLES BAAR, a citizen of the United States, residing at Grand Rapids, in the county of Kent and State of Michigan, have invented certain new and useful Improvements in Boring-Tools; and I do hereby declare the following to be a full, clear, and exact description of the invention, such as will enable others skilled in the art to which it appertains to make and use the same.

My invention relates to improvements in boring-tools, and more particularly to tools for counterboring the legs of furniture, whereby a socket is formed to receive the caster and the leg adapted to surround the caster-wheel and come down close to the floor.

The object of my invention is to more securely fasten the cutters, to provide for adjusting and clamping the same, to provide a simple and durable tool, and to provide the device with various new and useful features hereinafter more fully described, and particularly pointed out in the claims.

My device consists, essentially, of a cylindrical head provided with a shank for attaching the same to the spindle of a machine, a screw-threaded socket in the axis of the head and opposite the shank, and a bit inserted in the socket, the head being provided with slots inclined to its axis and extending transversely through the head, in which slots are inserted cutters for forming the recess and having openings through which is inserted a binding-screw, whereby the cutters are secured and adjustably clamped in the head, and in various features of construction and arrangement hereinafter more fully described, reference beng had to the accompanying drawings, in which—

Figure 1:
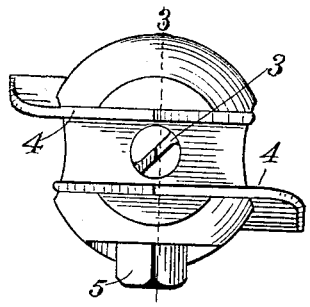
Figure 5:
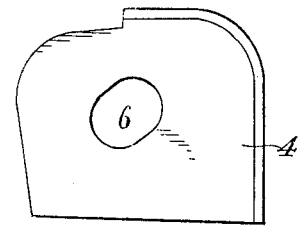
Figure 2:
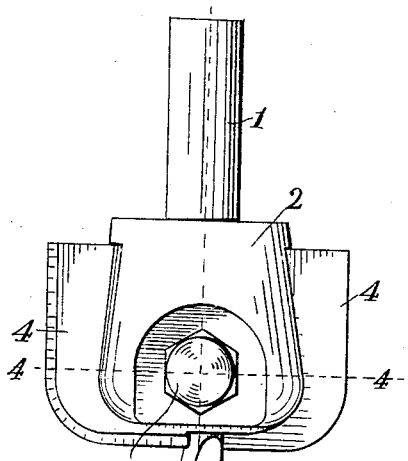
Figure 3:
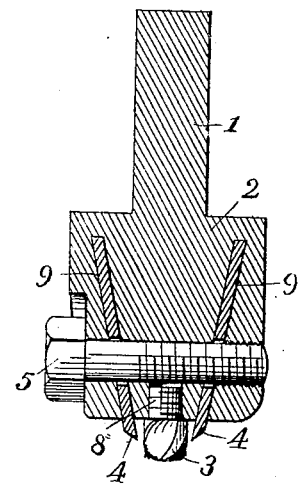
Figure 4:
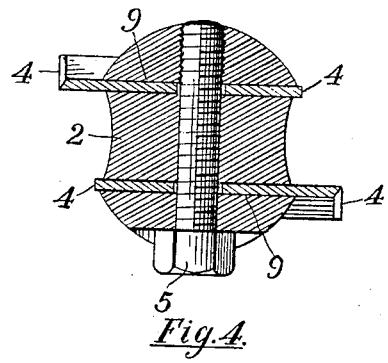

Figure 1 is an end view of a device embodying my invention; Fig. 2, a side elevation of the same; Fig. 3, a section through the axis of the device, taken on the lines 3 3 of Figs. 1 and 2; Fig. 4, a transverse section of the same on the line 4 4 of Fig. 2, and Fig. 5 a detail in plan of one of the cutters.

Like numbers refer to like parts in all of the figures.

1 represents a shank adapted to be inserted in the spindle of a boring-machine or other means for rotating the tool.

2 is a cylindrical head preferably integral with the shank and having a screw-threaded socket in its axis and at the end opposite the shank to receive a bit 3, which bit forms the hole or opening for the caster-socket. The head 2 is also provided with slots 9, extending from its lower end and close to the bit to near its upper end and diverging outward from its axis, whereby the cutters 4, inserted therein, converge toward the axis at their lower or cutting edges. These slots extend wholly through the head transversely. The cutters extend within these slots and are provided with elongated openings 6, through which a binding-screw 5 is inserted. This screw also extends transversely through the axis of the head 2 and engages a screw-thread in the outer portion of the head outside of one of the slots 9 and opposite the head of the screw 5, the opening for the screw throughout the remaining portions of the head being of sufficient diameter to permit free longitudinal movement of the screw therein. Thus when the screw is tightened the outer portions of the head outside the slots 9, being disconnected from the rest of the head except at the upper end, serve as clamps and are drawn firmly against the cutters, which are thus securely clamped in place. It will also be noted that the cutters will not escape from the slots should the screw become loosened, and thus the device is rendered more secure and safe from accident. These cutters 4 operate to rapidly remove the material surrounding the opening formed by the bit 3, and thus form a recess in the bottom of the leg to receive the caster-wheel and adapt the leg to surround the caster-wheel and extend close to the floor.

Having thus fully described my invention, what I claim, and desire to secure by Letters Patent, is—

1. A boring-tool comprising a head having a socket in its axis and also having tangential slots at opposite sides of the socket and extending transversely through the head, a bit inserted in the socket, cutters in the slots, and a binding-screw extending transversely through the head and cutters.

2. A boring-tool comprising a head having an axial socket at one end, and a shank at the other end, and also having upwardly-diverging tangential slots at opposite sides of the socket and extending transversely through the head, a bit inserted in the socket, cutters inserted in the slots, and a binding-screw extending through the axis of the head and through openings in the cutters.

3. A boring-tool comprising a head having a socket in its axis and also having tangential slots at opposite sides of the socket and extending transversely through the head, a bit inserted in the socket, cutters having both end and side cutting edges and inserted in the slots, and a binding-screw extending transversely through the head and cutters.

4. A boring-tool comprising a cylindrical head having an axial socket at one end and a shank at the other end, and also having upwardly-diverging tangential slots at opposite sides of the socket, a bit in the socket, cutters in the slots and provided with internal openings, and a screw extending through the head and cutters.

5. A boring-tool comprising a head having transverse tangential slots extending therethrough, cutters inserted in said slots and a binding-screw extending through the head and cutters, whereby the cutters are clamped in the slots.

6. A boring-tool, comprising a head having transverse upwardly-diverging slots at opposite sides of its axis, cutters inserted in said slots, and a binding-screw extending transversely through the axis of the head and through the cutters.

7. A boring-tool comprising an integral head having transverse upwardly-diverging slots therethrough, cutters inserted in the slots and having both end and side cutting edges, and a clamping-bolt extending transversely through the axis of the head and through the cutters.

In testimony whereof I affix my signature in presence of two witnesses.

CHARLES BAAR.

Witnesses:
   LUTHER V. MOULTON,
   GEORGIANA CHACE.